(12) United States Patent
Suneya

(10) Patent No.: US 7,817,903 B2
(45) Date of Patent: Oct. 19, 2010

(54) DATA RECORDING APPARATUS, METHOD, PROGRAM, AND RECORDING MEDIUM

(75) Inventor: Toru Suneya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1154 days.

(21) Appl. No.: 11/425,464

(22) Filed: Jun. 21, 2006

(65) Prior Publication Data

US 2006/0291798 A1  Dec. 28, 2006

(30) Foreign Application Priority Data

Jun. 28, 2005  (JP) .............................. 2005-188297

(51) Int. Cl.
*H04N 5/91* (2006.01)
(52) U.S. Cl. ......................................... 386/95; 386/107
(58) Field of Classification Search .................. 386/46, 386/52, 83, 95, 107, 117
See application file for complete search history.

(56) References Cited

U.S. PATENT DOCUMENTS

| | | | |
|---|---|---|---|
| 6,985,669 B1* | 1/2006 | Unger | 386/46 |
| 7,257,308 B2* | 8/2007 | Plourde et al. | 386/46 |
| 2002/0159760 A1 | 10/2002 | Karasudani et al. | |
| 2005/0047749 A1 | 3/2005 | Kaibe | |
| 2006/0152636 A1* | 7/2006 | Matsukawa et al. | 348/715 |
| 2007/0053658 A1 | 3/2007 | Murakami et al. | |

FOREIGN PATENT DOCUMENTS

| | | |
|---|---|---|
| JP | 2000-021093 A | 1/2000 |
| JP | 2000-285653 A | 10/2000 |
| JP | 2004-312268 A | 11/2004 |
| JP | 2005-079891 A | 3/2005 |
| JP | 2005-117534 A | 4/2005 |
| WO | WO01/37563 A1 | 5/2001 |

* cited by examiner

*Primary Examiner*—Huy T Nguyen
(74) *Attorney, Agent, or Firm*—Canon USA Inc IP Div

(57) ABSTRACT

A data recording apparatus and a data recording method to record multimedia files are provided. The data recording apparatus is configured to record media data into a file on a fragment-by-fragment basis. At least one fragment of the data is deleted in chronological order, starting with the data for the oldest fragment, if an amount of data recorded exceeds a determined amount of data. When data recording is ended, data for the fragments is rearranged in chronological order.

14 Claims, 14 Drawing Sheets

```
aligned(8) class Box (unsigned int(32) boxtype,
                     optional unsigned int(8)[16] extended_type) {
    unsigned int(32) size;
    unsigned int(32) type = boxtype;
    if (size==1) {
        unsigned int(64) largesize;
    } else if (size==0) {
        // box extends to end of file
    }
    if (boxtype=='uuid') {
        unsigned int(8)[16] usertype = extended_type;
    }
}
```

```
aligned(8) class TrackExtendsBox
         extends FullBox('trex', 0, 0){
    unsigned int(32) track_ID;
    unsigned int(32) default_sample_description_index;
    unsigned int(32) default_sample_duration;
    unsigned int(32) default_sample_size;
    unsigned int(32) default_sample_flags;
}
```

|  | START ADDRESS | SIZE | FLAG |
|---|---|---|---|
| Flag. 1 | REFERENCE OFFSET (1) | DATA SIZE (1) | EVEN FLAG (1) |
| Flag. 2 | REFERENCE OFFSET (2) | DATA SIZE (2) | EVEN FLAG (2) |
| Flag. 3 | REFERENCE OFFSET (3) | DATA SIZE (3) | EVEN FLAG (3) |
| ⋮ | ⋮ | ⋮ | ⋮ |

DATA RECORDING APPARATUS, METHOD, PROGRAM, AND RECORDING MEDIUM

BACKGROUND OF THE INVENTION

1. Field of the Invention

The present invention relates to a data recording method, an apparatus, and a program suitable for recording multimedia files.

2. Description of the Related Art

With recent diversification of moving image and audio encoding formats, there is a growing need for the capability of interchangeably processing such various formats in a unified framework. In response to this need, the International Organization for Standardization/International Engineering Consortium (ISO/IEC) JTC1/SC29/WG11 has standardized a general-purpose file format called the "ISO Base Media File Format" for recording moving-image and audio content data, such as MPEG data, into files.

Since the file format based on this standard is defined as a fundamental file format rather than a particular encoding format, a separate standard needs to be defined by partially extending this standard in order to support a particular encoding format or adjust to a particular objective. One typical example of such extensions is the "MP4 file format", which is a standard file format for recording moving-image and audio encoded data in accordance with MPEG-4. Another example of format associated with moving images and audio in accordance with MPEG-4 is the 3GPP file format, which is defined by the Third Generation Partnership Project (3GPP) as a moving-image-file standard with restrictions on the assumption that it is used on wireless terminals, particularly on third-generation mobile phones.

Considering that a growing number of devices, such as digital cameras and cellphones, are employing these file formats to record moving-image and audio data encoded in accordance with MPEG-4, these file formats are likely to become more popular in the future.

Since MPEG-4 is a relatively high-compression encoding scheme with a superior error correction technique, especially in streaming distribution, such file format may also have applications to monitoring cameras (monitoring video) for storage of recorded data. With this being the situation, needs for storing long-hour monitoring video and audio on a recording medium have not been fulfilled because recording can be terminated at the time the capacity of the recording medium runs out, which is likely to occur if the recording medium does not have a sufficient capacity.

Needs for keeping (recording) at least the latest data may be fulfilled by recording data into divided files so that an old data file can be replaced with the latest data file when the recording medium does not have a sufficient capacity. In this approach for keeping (recording) the latest data on the recording medium, because data is saved in separate files, the files may be associated with one another by using a playlist to achieve operability. This approach, however, can be problematic in general with versatility and operability because the playlist function may not be available if the separate files are moved to another playback system for playback.

In this manner, the conventional techniques may have problems with, for example, general versatility and operability of recorded data when relatively long hours of moving image or audio data, such as monitoring video, is to be recorded on a recording medium with a limited capacity.

SUMMARY OF THE INVENTION

In light of these circumstances, embodiments of the present invention provide a technique for allowing data to be recorded onto a recording medium with a limited capacity by assigning priority to the latest data while general versatility of the recorded data is still ensured.

According to one aspect of the present invention, a data recording apparatus records media data of at least one of moving image data and audio data into a file. The data recording apparatus includes a recording section configured to record the media data on a fragment-by-fragment basis, and a joining section configured to join the media data in fragments time-sequentially. If an amount of data recorded by the recording section exceeds a predetermined amount of data, the recording section deletes at least one fragment of the media data in chronological order, starting with the media data for the oldest fragment.

According to another aspect of the present invention, a data recording method is provided for recording media data of at least one of moving image data and audio data into a file. The method includes recording media data into a file on a fragment-by-fragment basis, and joining the media data in fragments time-sequentially. If the amount of data recorded exceeds a determined amount of data, at least one fragment of the media data is deleted in chronological order, starting with the data for the oldest fragment.

According to still another aspect of the present invention, a computer program is provided to cause an apparatus to execute the above-described data recording method.

According to yet another aspect of the present invention, a computer-readable recording medium is provided to store the above-described computer program. More specifically, the computer-readable medium has instructions stored thereon which, when executed by a data recording apparatus, causes the data recording apparatus to perform a method including recording media data into a file on a fragment-by-fragment basis, and joining the media data in fragments time-sequentially. The method further includes deleting at least one fragment of the media data in chronological order, starting with the media data for the oldest fragment, if an amount of data recorded exceeds a determined amount of data.

Further features of embodiments of the present invention will become apparent from the following description of exemplary embodiments with reference to the attached drawings.

BRIEF DESCRIPTION OF THE DRAWINGS

FIG. 14 is a diagram depicting an exemplary definition of fields in Track Extends Box ('trex').

FIG. 16 is a diagram depicting a method of recording an event flag according to an exemplary embodiment of the present invention.

DESCRIPTION OF THE EMBODIMENTS

Embodiments according to the present invention will now be described in detail with reference to the drawings.

Although the embodiments according to the present invention are described by way of an example where files mainly in the MP4 file format are processed, the description applies not only to the MP4 file format but also other similar file formats. For example, the ISO formulates the "Motion JPEG 2000 file format" (ISO/IEC 15444-3) and the "AVC file format" (ISO/IEC 14496-15) as standards for file formats having a basic structure similar to that of the MP4 file format. Including these standards and the above-described 3GPP file format, part or all of embodiments of the present invention can be applied to file formats similar to the MP4 file format and standards employing an architecture similar to that of the MP4 file format.

Figure 1:
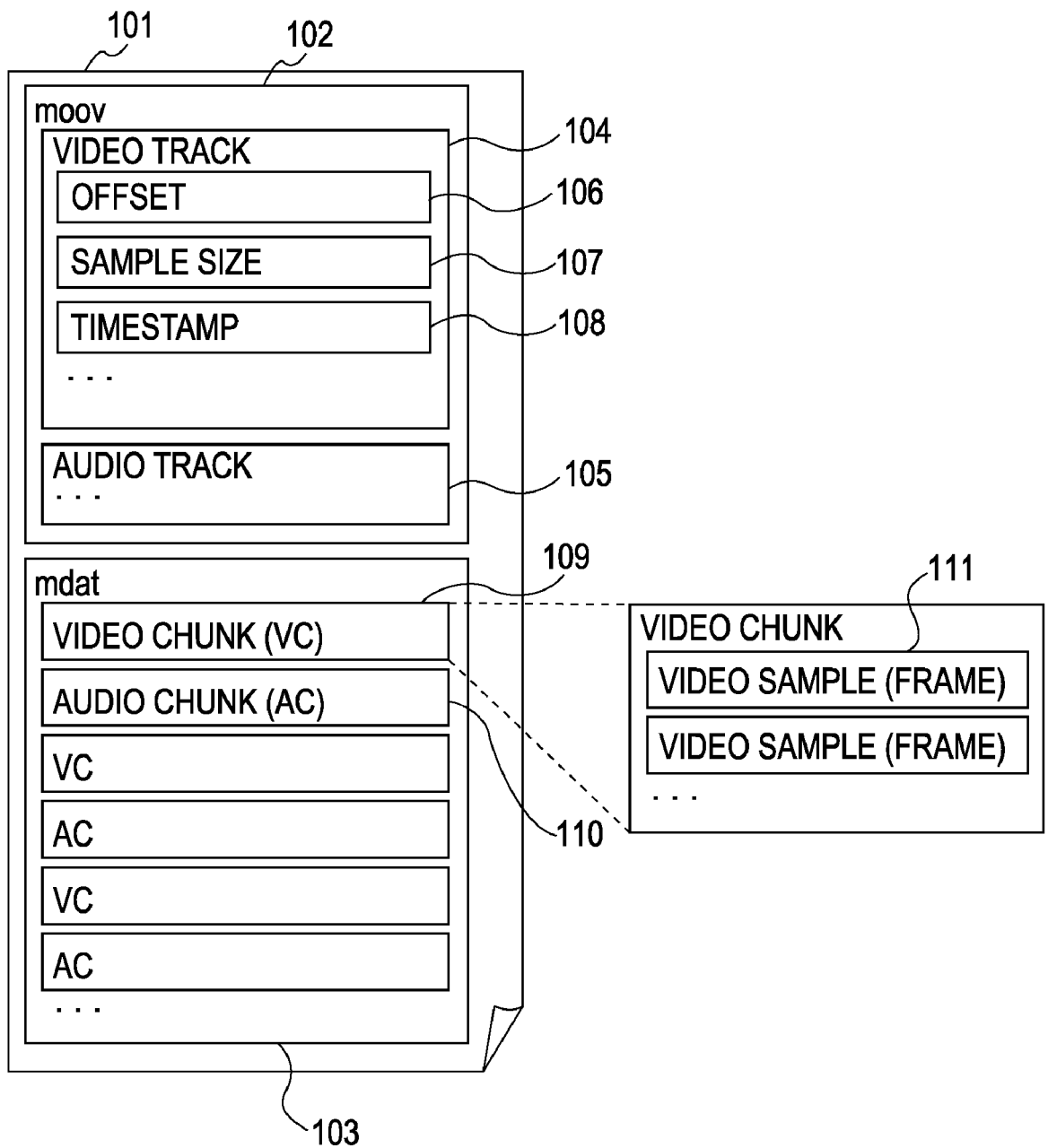
FIG. 1 is a schematic diagram depicting an exemplary data structure in an MP4 or a similar file format.

FIG. 1 is a schematic diagram depicting an exemplary data structure in an MP4 or a similar file format.

An MP4 file 101 includes metadata (header information) 102 indicating a physical position, a temporal position, and characteristic information of video and audio data and media data 103 indicating the actual content of the encoded video and audio data.

In the MP4 file format, the presentation of the entire content is referred to as a "movie" and the presentation of a media stream including the content is referred to as a "track". The metadata 102 typically includes a video track 104 for logically handling the entire moving-image data and an audio track 105 for logically handling the entire audio data. The video track 104 and the audio track 105 include nearly the same basic components.

More specifically, both tracks store various items of metadata information of actual media data, with slight differences in content depending on characteristics of the media data.

The video track 104 includes, for example, information about the structure of a decoder for decoding encoded data and information about the rectangular size of the moving image. The video track 104 further includes an offset 106 indicating the position in the file where the media data is actually recorded, a sample size 107 indicating the size of each item of frame data (called a picture in some cases) in the media data, a timestamp 108 indicating the decoding time of each item of frame data, and so on.

On the other hand, the media data 103 stores the actual content of moving-image and audio data in units of "chunk", which contains at least one "sample" serving as a basic constituent of the encoded data. There are two types of chunks: a video chunk 109 storing moving-image media data and an audio chunk 110 storing audio media data. The video chunk 109 and the audio chunk 110 correspond to the video track 104 and the audio track 105, respectively, in the metadata 102.

Although the video chunk 109 and the audio chunk 110 are recorded alternately in FIG. 1, the recording positions and order thereof are not particularly limited. The pattern in FIG. 1 is only a typical example of recording format. Nevertheless, this alternate arrangement (interleave) of chunks is very common because moving-image data and audio that should be played back substantially at the same time are disposed close to one another, thus enhancing accessibility to desired data in the file.

Each chunk includes at least one sample of individual media data. For example, as shown in FIG. 1, a video sample (frame) 111 is recorded successively in the video chunk 109. In general, this video sample (frame) 111 corresponds to one item of frame data (picture) of video.

Tracks and chunks are associated as follows.

For example, in the case of moving-image data, information in the video track 104 includes information about each video chunk 109 in the media data 103.

More specifically, the offset 106 includes a table of information indicating the relative position of each video chunk 109 in the file so that the position of an actual video chunk can be found by referring to the corresponding entry of the table, at whichever position the video chunk is recorded.

The sample size 107 describes in the form of a table the sizes of a plurality of video samples (frames) included in a plurality of chunks. Moreover, information designating the number of samples included in each chunk is also described in the video track 104. Based on these items of information, desired samples included in a video chunk 109 can be acquired correctly.

The timestamp 108 records the decoding time of each sample in a table as a difference between samples. A so-called timestamp of each sample can be acquired by calculating a cumulative time with reference to this table.

These relationships between the video track 104 and the video chunk 109 also hold between the audio track 105 and the audio chunk 110.

In the MP4 file format and the ISO Base Media File Format with this structure, desired units of encoded data can be acquired, starting at a desired position, together with additional information such as a timestamp, by using the information in the metadata 102 and the media data 103.

It should be noted, however, that some recorded information, though being standardized, is not described here to simplify the description. More details of standardized definition are described in the corresponding portion of ISO/IEC 14496.

In the MP4 file format, data to be recorded into a file is described in a data structure called a "BOX", so that the data is recorded in the file on a BOX-by-BOX basis.

Figures 2, 3:
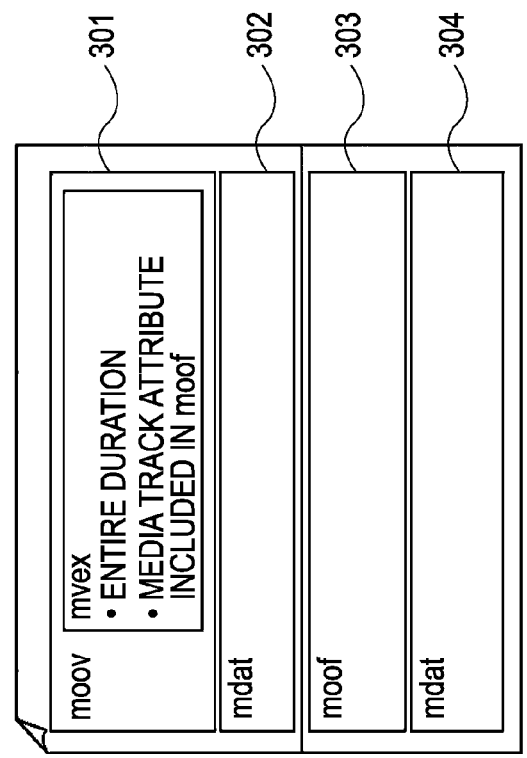
FIG. 2 is a diagram depicting an exemplary definition of fields in BOX.
FIG. 3 is a schematic diagram of an exemplary file structure in a fragment movie format.

FIG. 2 is a diagram depicting an exemplary definition of fields in a BOX. The illustrated BOX includes the following fields.

Size: size of the entire BOX, including the size field itself.

Type: four-byte type identifier indicating the type of the BOX. The BOX type is usually represented in four alphanumeric characters. The other fields are optional depending on the BOX, and a description thereof will be omitted.

Different types of data recorded in a file are retained in different types of BOX. For example, the media data 103 is recorded in Media Data BOX (designated by 'mdat' in the type field) for storing encoded data, and the metadata 102 is recorded in Movie BOX (designated by 'moov' in the type field) for storing metadata information of the entire content. Hereinafter, it is assumed that the identifier of a BOX type indicates that BOX type itself.

Furthermore, information about the above-described chunk and sample is recorded track by track in Movie BOX in the form of the following BOX types. The offset position of the chunk in the file is recorded in Chunk Offset BOX ('stco'). The correspondence between the sample and the chunk is recorded in Sample to Chunk BOX ('stsc'). The time information of each sample is recorded in Time To Sample BOX ('stts'). The size information of each sample is recorded in Sample Size BOX ('stsz'). Information about a randomly accessible sample is recorded in Sync Sample BOX ('stss'). Characteristic information applied to the sample is recorded in Sample Description BOX ('stsd').

In addition, the MP4 file format allows not only a format in which all metadata is recorded in moov but also a format in which metadata is recorded divided into a plurality of areas arranged in chronological order. This format is called a "fragment movie".

FIG. 3 shows an exemplary file structure in a fragment movie format. In the fragment-movie format, the media data and metadata of content can be divided in units of desired time so that the divided "fragments" are recorded in chronological order starting at the beginning of the file. In FIG. 3, for example, a moov 301 indicates the metadata of the first fragment and retains information about data included in an mdat 302. The subsequent moof 303 indicates the metadata of the second fragment and retains information about an mdat 304. This pattern is repeated to record other fragments.

As described above, in a file in the MP4 file format, various types of attributes about media data are retained in a metadata area which is separate from the media data area to facilitate accessibility of desired sample data regardless of the physical storage pattern of the media data.

Figure 4:
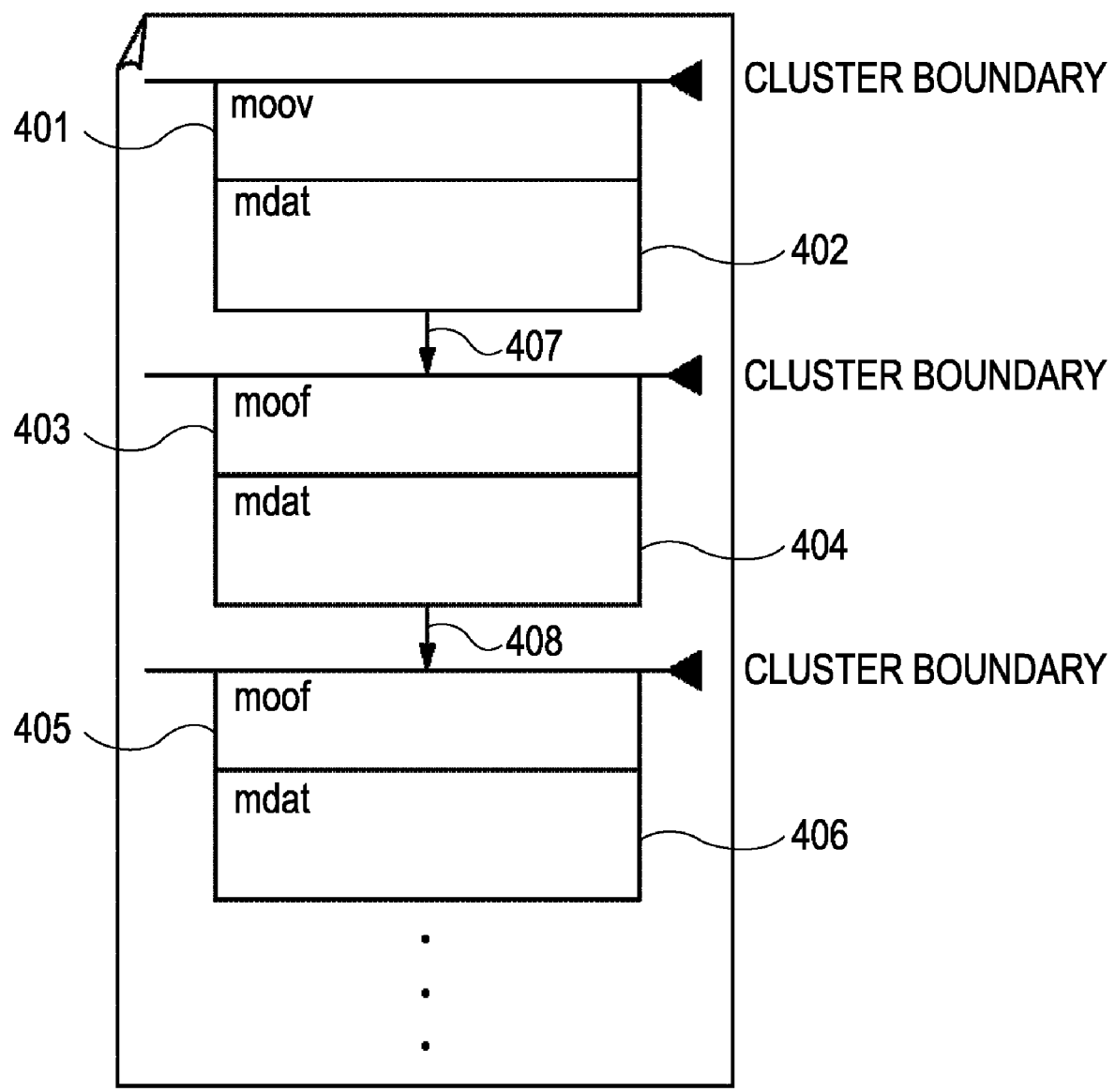
FIG. 4 is a diagram of an exemplary file structure to illustrate a general data recording method according to an exemplary embodiment of the present invention.

Referring to FIG. 4, a diagram of an exemplary file structure is provided to illustrate a method of recording moving-image and audio data in an exemplary embodiment of the present invention. In this embodiment, when data is to be written onto a recording medium in the fragment-movie format, the process of recording the data from a cluster boundary, continuing recording the data for a certain period of time, and recording the rest of data from the subsequent cluster boundary is repeated.

More specifically, the following process is repeated. Initially, a moov 401 is recorded from a cluster boundary. The recording of the moov 401 and an mdat 402 continues for a certain period of time. Subsequently, the recording point is moved from the end of the mdat 402 to the cluster boundary of the subsequent free space (407). Once the recording point has moved to the cluster boundary of the subsequent free space (407), the subsequent fragment moof 403 and an mdat 404 are recorded. When recording of this fragment is completed, the recording point is moved again to the cluster boundary of the subsequent free space (408) to record the fragment moof 405 and an mdat 406 in the same manner.

Normally, it is not necessary to start recording of each fragment at a cluster boundary. By starting recording fragments from a cluster boundary, the fragments can be sorted quickly in chronological order and joined with one another. This joining process will be described later in detail.

Eventually, the free space from the end of mdat data to the subsequent cluster boundary needs to be set in Free Space BOX ('free'). This setting may be carried out as required during recording or may be carried out all at once after recording is completed.

A recording medium in this case typically includes a writable disk medium, such as a memory card, a hard disk, or a Digital Versatile Disc (DVD). Because these recording media have a limited recording capacity, new data cannot be written when the recording capacity runs out as a result of the above-described process of recording moving-image and audio data.

Figure 5:
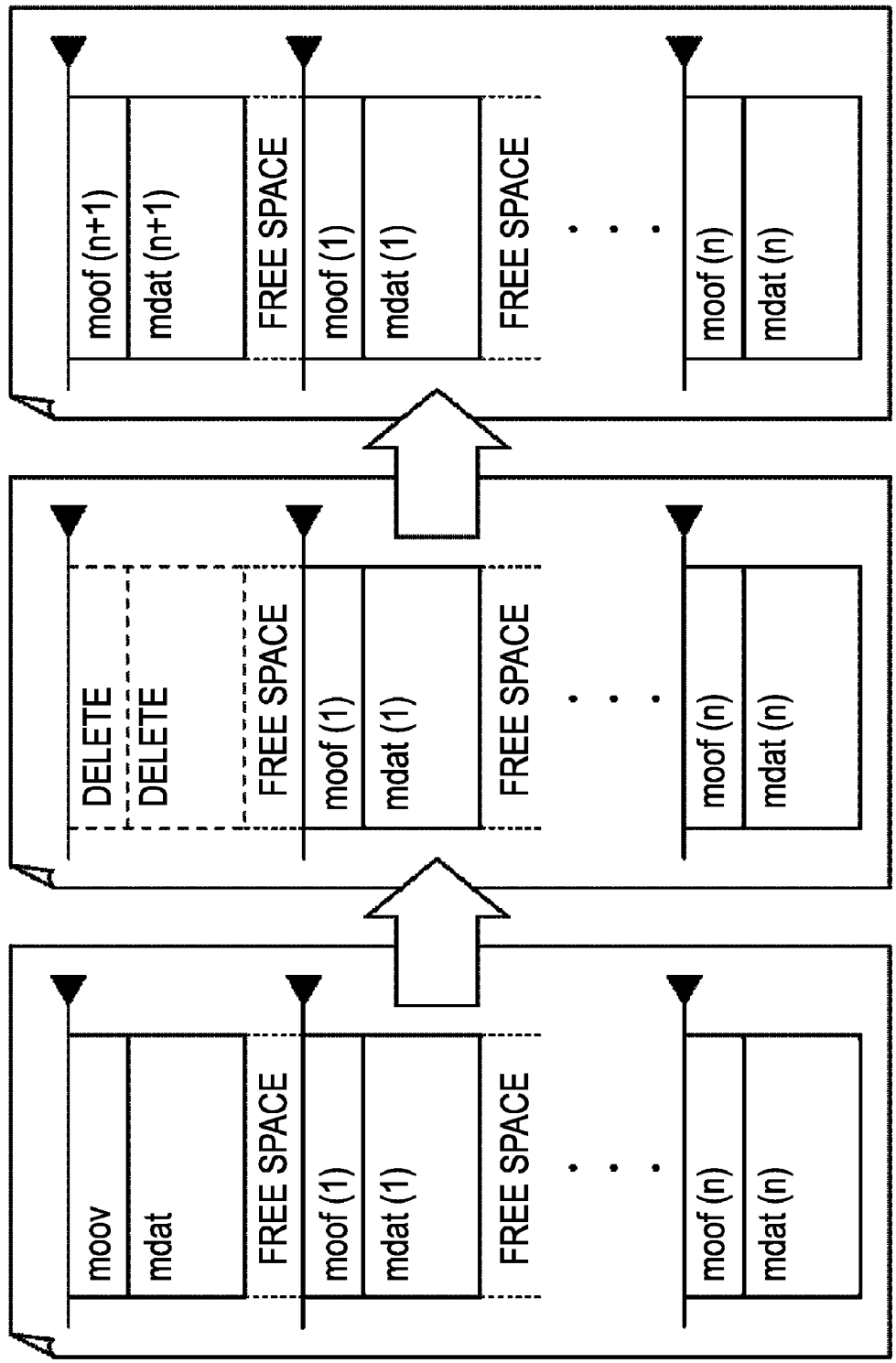
FIG. 5 is a diagram depicting a method for recording the latest data into a file, according to an exemplary embodiment of the present invention.

In light of this circumstance, according to an exemplary embodiment of the present invention, when the amount of data recorded as shown in FIG. 5 reaches the maximum capacity or a predetermined set capacity of the recording medium, data is deleted, starting with the oldest of all fragments including the fragment having the moov-format header information at the beginning of the fragment movie so that new data can be recorded in the area from which the oldest fragment is removed.

More specifically, the data to be deleted first when a predetermined capacity limit is reached normally includes the moov-format header information (metadata) at the beginning of the fragment movie and the mdat (media data) corresponding to the moov. Thus, this data is replaced with new data including moof-format metadata and mdat corresponding to the moof-format metadata. The data to be deleted subsequently includes the moof-format metadata that has been recorded first and the mdat corresponding to that moof-format metadata. Similarly, new data including moof-format metadata and mdat is recorded in the area from which the old data has been deleted. New data is written into the file in this manner by repeating the above-described operation.

In practice, media data having the same time length does not always have the same size; the size of media data differs depending on, for example, the encoding format. For this reason, overwriting data needs to be performed under appropriate control to secure an area large enough to store newly written data. In short, it may be desirable to assume that two or more fragments are required to be deleted at a time to secure an area for a single item of data to be newly written.

Figure 6:
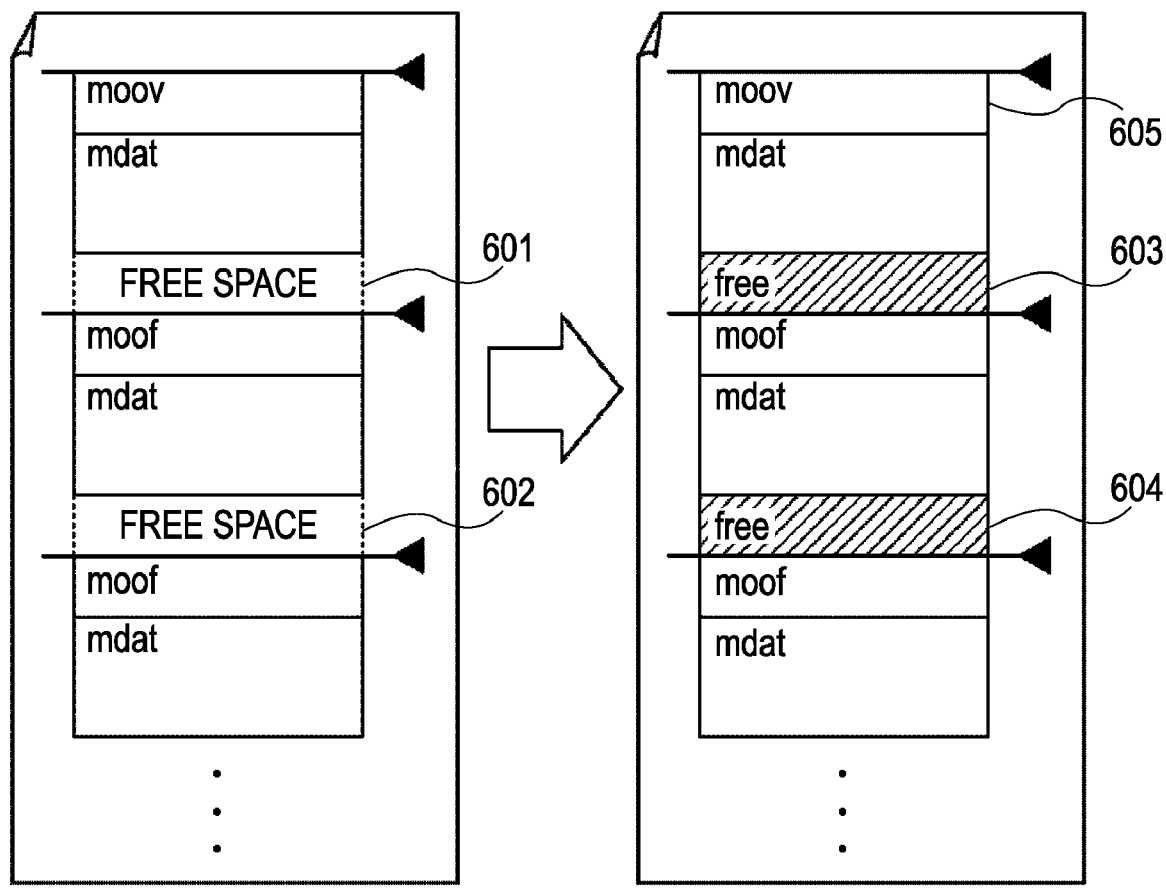
FIG. 6 is a diagram depicting a basic data processing method at the time recording is finished, according to an exemplary embodiment of the present invention.

If the data (metadata in the moov format) at the beginning of the fragment movie remains, as shown in FIG. 6, when recording is finished, the entire duration of the final content, including the fragments in a moov 605, is set. If free spaces (601, 602) between fragments are not set as free, these spaces are set as free (603, 604) to generate an MP4 file in the fragment-movie format.

Figure 7:
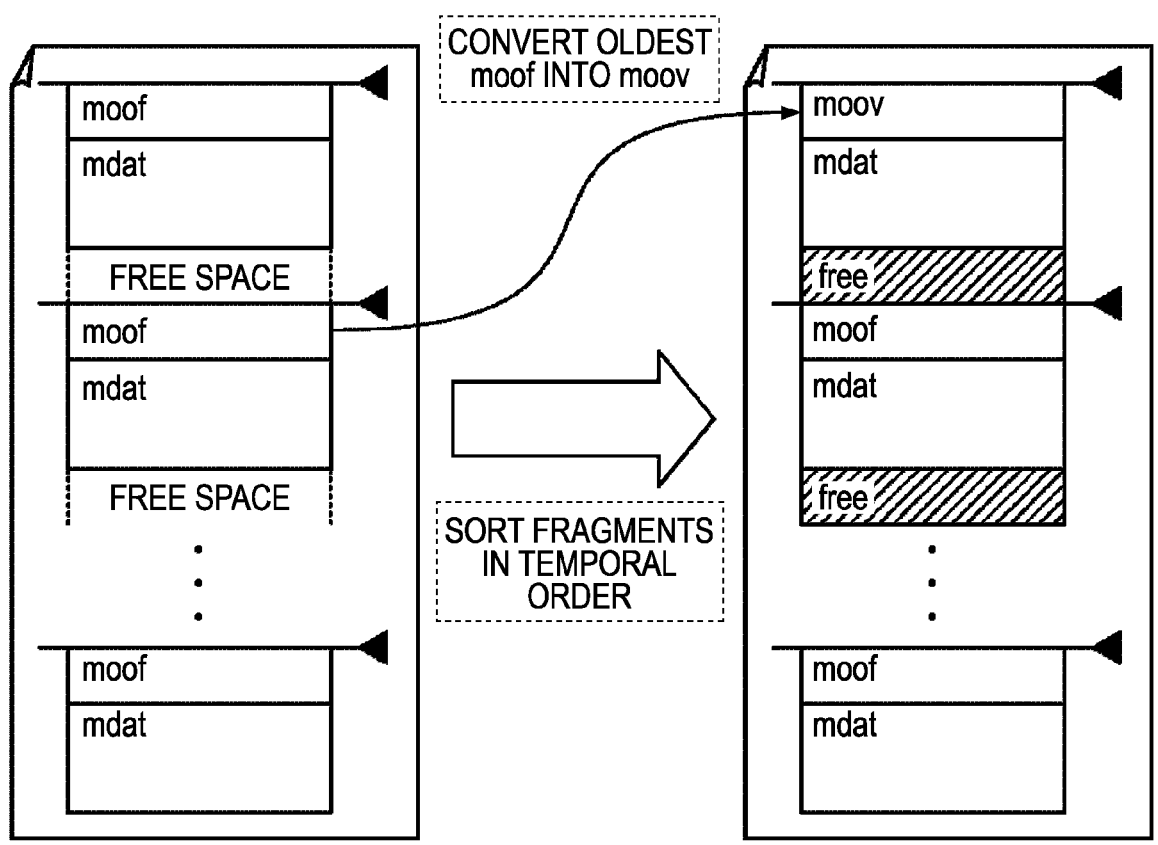
FIG. 7 is a diagram depicting a method for converting a file storing the latest data into a correct MP4 file format at the time recording is finished, according to an exemplary embodiment of the present invention.

On the other hand, if the original data at the beginning of the fragment movie has been deleted, as shown in FIG. 7, the data for the oldest of all remaining fragments needs to be moved to the beginning of the file after the corresponding metadata in the moof format is converted into metadata in the moov format. Subsequently, the fragments in the file structure are sorted in chronological order and joined together, and then a correct value is set to the offset information included in the moof of each fragment. Furthermore, if there is a free space between fragments that is not set as free, the free space is set as free to complete an MP4 file in the fragment-movie format.

First Exemplary Embodiment

Figure 8:
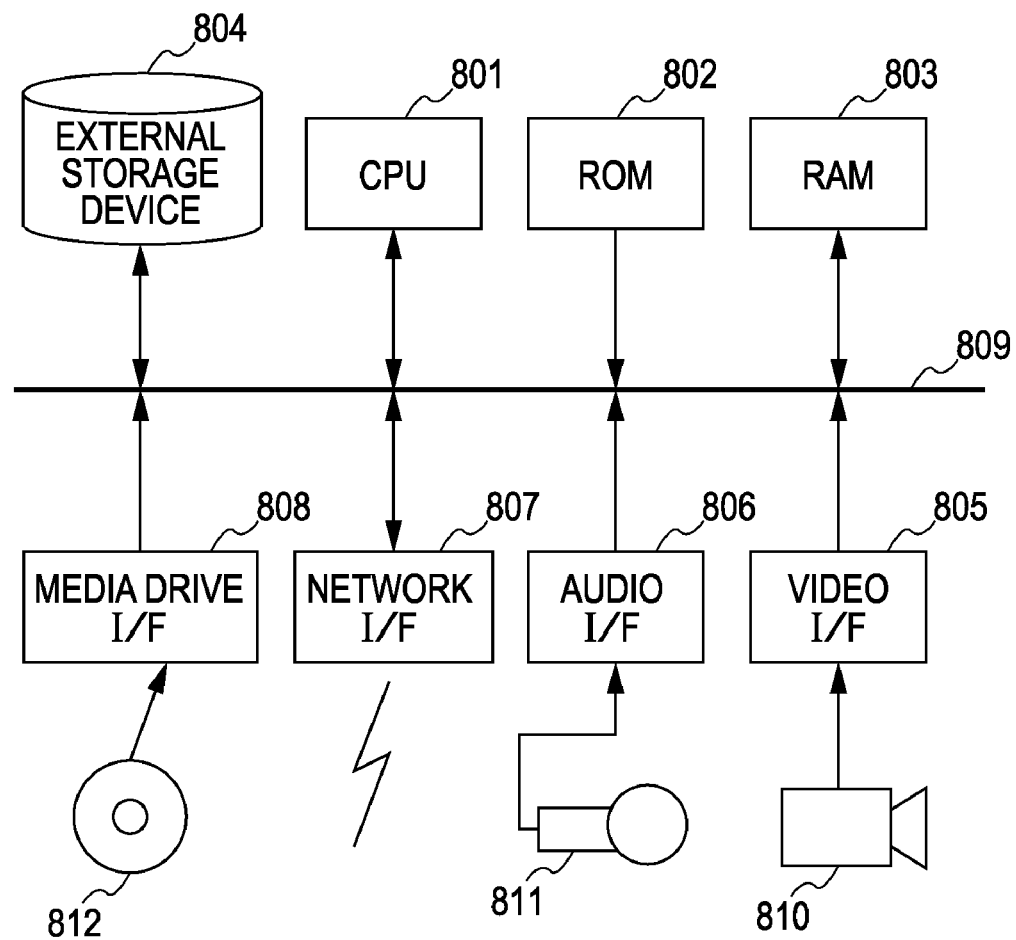
FIG. 8 is a block diagram depicting components of an information processing apparatus according to an exemplary embodiment of the present invention.

FIG. 8 is a block diagram depicting components of an information processing apparatus according to a first exemplary embodiment of the present invention. In accordance with one aspect of the present invention, the information processing apparatus is configured to perform recording such that the latest data of moving-image and audio multimedia data is kept (recorded) on a recording medium.

Referring to FIG. 8, a CPU 801 executes a recording process described in the form of a control program stored in a ROM 802, a RAM 803, or an external storage device 804. The control program stored in the external storage device 804 is loaded into the RAM 803 and is then executed by the CPU 801.

Video data input from a video input device 810 via a video interface (I/F) 805 and audio data input from an audio input device 811 via an audio I/F 806 are recorded onto a medium 812 such as a memory card, a Compact Disc (CD), or a DVD via a medium drive I/F 808. Furthermore, the video data and the audio data may be recorded onto an external storage device over a network (including the Internet and a LAN, whether they are wired or wireless) via a network I/F 807.

The components described above are interconnected via a bus 809 so as to communicate with one another to achieve various functions.

Figure 9:
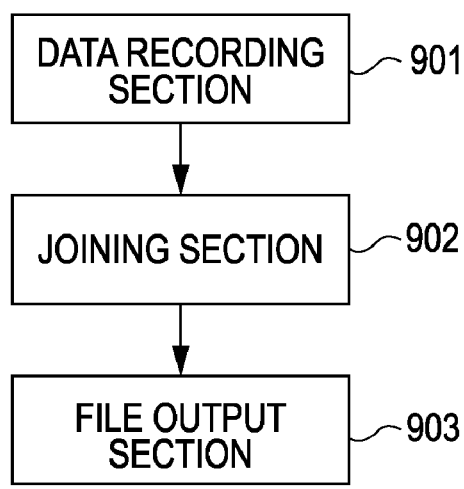
FIG. 9 is an example configuration of functional modules for carrying out recording of multimedia data according to an exemplary embodiment of the present invention.

FIG. 9 is an example module of functional modules for carrying out recording of multimedia data according to an exemplary embodiment of the present invention. This module configuration depicts components of a multimedia data recording program executed by the CPU 801 in the information processing apparatus shown in FIG. 8.

Referring to FIG. 9, a data recording section 901 first receives parameters necessary for operation control, including the time length of each fragment to be recorded; the free storage space on the recording medium; the upper limit of the output file size; the bit rate of input moving image or audio data, and so on. Then, the data for moving image or audio is input as data is recorded into a file while control with the above-described parameters is in progress.

A joining section 902 has a function for sorting the fragments in chronological order and joining (reconstructing) them together. This process is performed typically after data recording into the file is completed.

A file output section 903 performs conversion of metadata, correction of offset values, and so on so that the reconstructed file comes out as correct data to generate an MP4 file in the fragment-movie format and then outputs the generated file to the recording medium as an output file.

Next, general operations for carrying out data recording according to this embodiment will be described with reference to the flowchart of FIG. 10.

First, in step S101, parameters necessary for operation control are received and retained, for example, in a memory. These parameters include the time length of each fragment to be recorded, the free storage space on the recording medium, the upper limit of the output file size, the data rate (bit rate) of the input moving-image or audio data, and so on.

Next, in step S102, information necessary for decoding input media data, information which is input optionally for the identification of the file, and so on are received. Furthermore, initialization of memory necessary for forming header information (metadata) for the fragment-movie format to be generated and so on are carried out.

Subsequently, in step S103, processing for recording the input media data into a file is started. In the subsequent step S104, if termination of recording is instructed with an arbitrary timing during data recording (S104, yes), the processing proceeds to the ending process for moving-image recording in step S105. Details of the ending process for moving-image recording will be described with reference to FIG. 11.

Next, in step S106, it is determined whether the playback time length of the data for the fragment currently being recorded has reached the time length of the fragment that was received in step S101. If the playback time length has not reached the received time length (S106, Yes), the flow returns to step S103, where recording of the data continues. If the playback time length has reached the received time length (S106, No), the flow proceeds to step S107.

In step S107, it is determined whether the size of the file being recorded has reached the upper limit of the output file size. If the upper limit of the output file size has been reached (S107, Yes), the flow proceeds to step S108, where data deletion is carried out starting with the data for the oldest of all fragments, including the fragment at the beginning of the file being recorded. Thereafter, the flow returns to step S103, where new data is recorded in the area from which the data has been removed. For data deletion at this time, it is not necessary to initialize data written in the file. Instead, it is sufficient to record the start addresses, the sizes, and the recording start times of all effective fragments in a memory or a different file and update these items of information, as the need arises, so that physical positions and positions on the time axis of these effective fragments currently in the file can be identified.

On the other hand, if the upper limit of the output file size has not been reached (S107, No), the flow proceeds to step S109, where the area from the write position of the current media data to the nearest cluster boundary is set in Free Space BOX ('free'), and then the flow proceeds to step S110.

In step S110, the write position of the subsequent fragment is set at a cluster boundary, and then the flow returns to step S103 to continue the recording processing.

In some cases, it may be necessary to reconstruct header information (metadata) other than the header information at the beginning of the fragment movie into the format for the header information (metadata) at the beginning of the fragment movie. For this reason, a difference between the format of the metadata at the beginning of the fragment movie and the format of other metadata in the fragment-movie format will be described briefly before proceeding to the description of the ending process for moving-image recording in step S105 of FIG. 10.

<Reconstruction (Conversion) Processing of Metadata>

Figure 12:
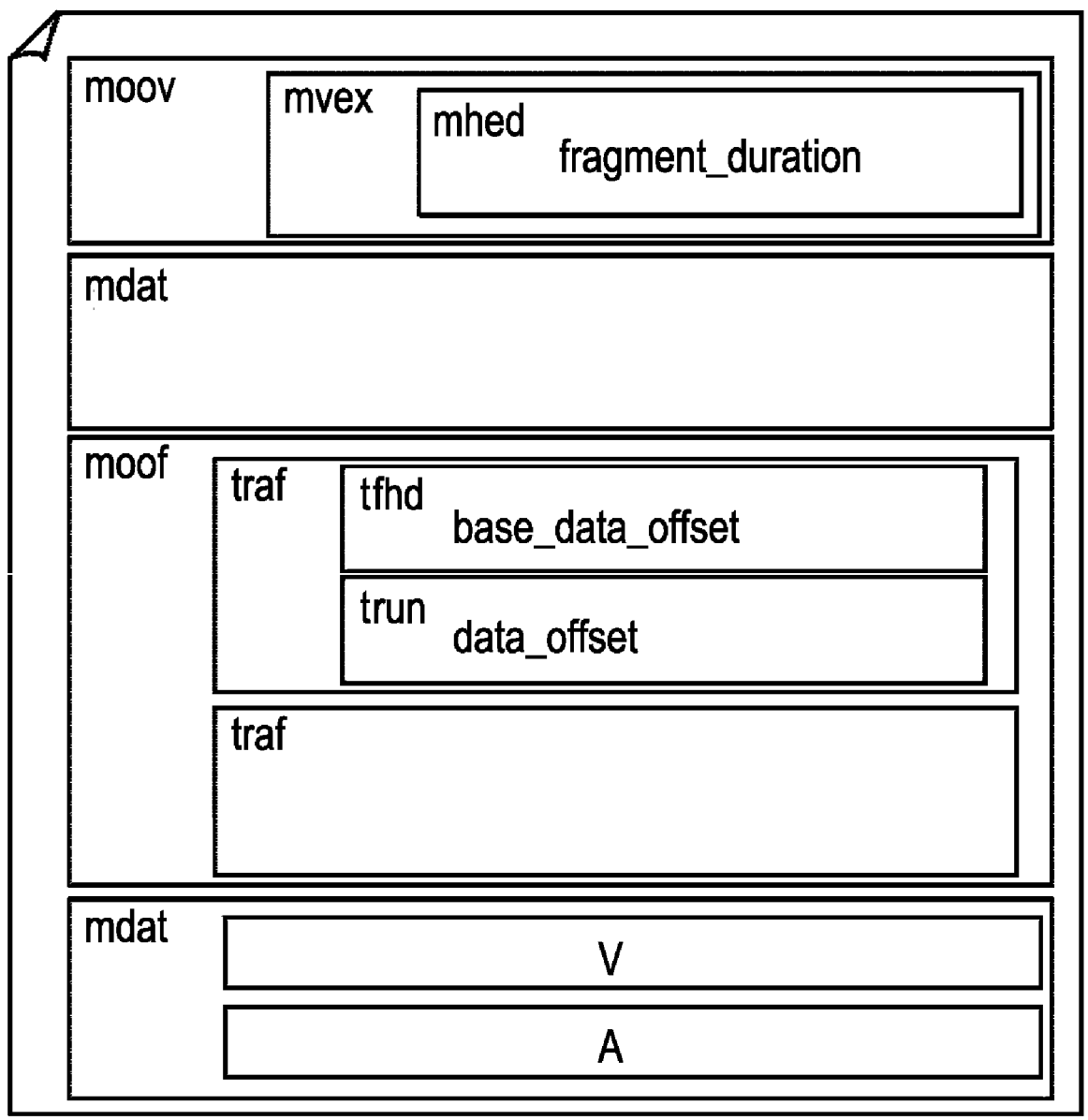
FIG. 12 is a schematic diagram depicting an exemplary file structure in the fragment-movie format.

FIG. 12 is a schematic diagram depicting an exemplary file structure in the fragment-movie format. Referring to FIG. 12, for a file in the fragment-movie format, the duration of the entire content including all fragments needs to be set in the fragment_duration field in Movie Extends Header BOX ('mehd') in Movie Extends BOX ('mvex') in the first moov. Furthermore, the reference offset of the subsequent mdat and the relative offset from the reference offset need to be set in the base_data_offset field in Track Fragment Header ('tfhd') in Track Fragment BOX ('traf') in the moof and the data_offset field in Track Fragment Run BOX ('trun') in the traf in the moof, respectively.

Therefore, reconstruction processing of metadata needs to be carried out in consideration of this format difference.

Next, the ending process for moving-image recording in step S105 of FIG. 10 will be described with reference to the flowchart in FIG. 11.

First, in step S201, it is determined whether the moov, which designates the header information format at the beginning of an MP4 file in the fragment-movie format, remains as an effective fragment.

If header information (metadata) in the moov format remains (S201, Yes), that is, if the corresponding fragment has not been deleted, the logical sequence of data in the file is in chronological order, and the flow proceeds to step S202. In this case, data sorting of the fragments is not necessary. This means that a correct MP4 file can be generated by setting the duration of the entire determined movie at the time recording is completed. Accordingly, in step S202, an MP4 file is generated by setting the duration of the entire movie at the time recording is completed.

More specifically, if the data (metadata in the moov format) at the beginning of the fragment movie remains, as shown in FIG. 6, an MP4 file in the fragment-movie format can be generated by setting the duration of the entire final content including all fragments in the fragment_duration field in Movie Extends Header BOX ('mehd') in Movie Extends BOX ('mvex') in the moov 605.

On the other hand, if the header information (metadata) in the moov format does not remain (S201, No), it is necessary to generate header information in the moov format through the header format conversion processing in step S203.

More specifically, if the data (metadata in the moov format) at the beginning of the fragment movie has been deleted, as shown in FIG. 7, the data for the oldest of all recorded fragments having headers in the moof format needs to be moved to the beginning of the file after the header in the moof format has been converted into a header in the moov format. Thereafter, in step S204, the fragments are sorted in chronological order and joined together. A method for converting a moof-format header into a moov-format header and a method for sorting fragments in chronological order to join them together will be described later.

Sorting the fragments in step S204 causes the offset value representing the position of each fragment in the file originally set in the header information of the fragment to reflect an incorrect value. For this reason, this offset value needs to be set again in step S205.

More specifically, correct values need to be set again for the reference offset of the subsequent mdat and the relative offset from the reference offset in the base_data_offset field in Track Fragment Header ('tfhd') in Track Fragment BOX ('traf') in the moof of each fragment and the data_offset field in Track Fragment Run BOX ('trun') in the traf in the moof, respectively.

At this time, by presetting the offset value at the start of each fragment for the reference offset (base_data_offset), processing can be carried out easily because even though the arrangement of fragments in the file are changed, as with this embodiment, it is sufficient to change only the reference offset, that is, the value of the relative offset (data_offset) does not need to be changed.

Finally, in step S206, the file is closed to output a correct file as an MP4 file in the movie fragment format. The processing that proceeds from step S201 to step S206 via step S202 represents the same processing procedure as one for generating an MP4 file in the normal movie fragment format.

Figure 11:
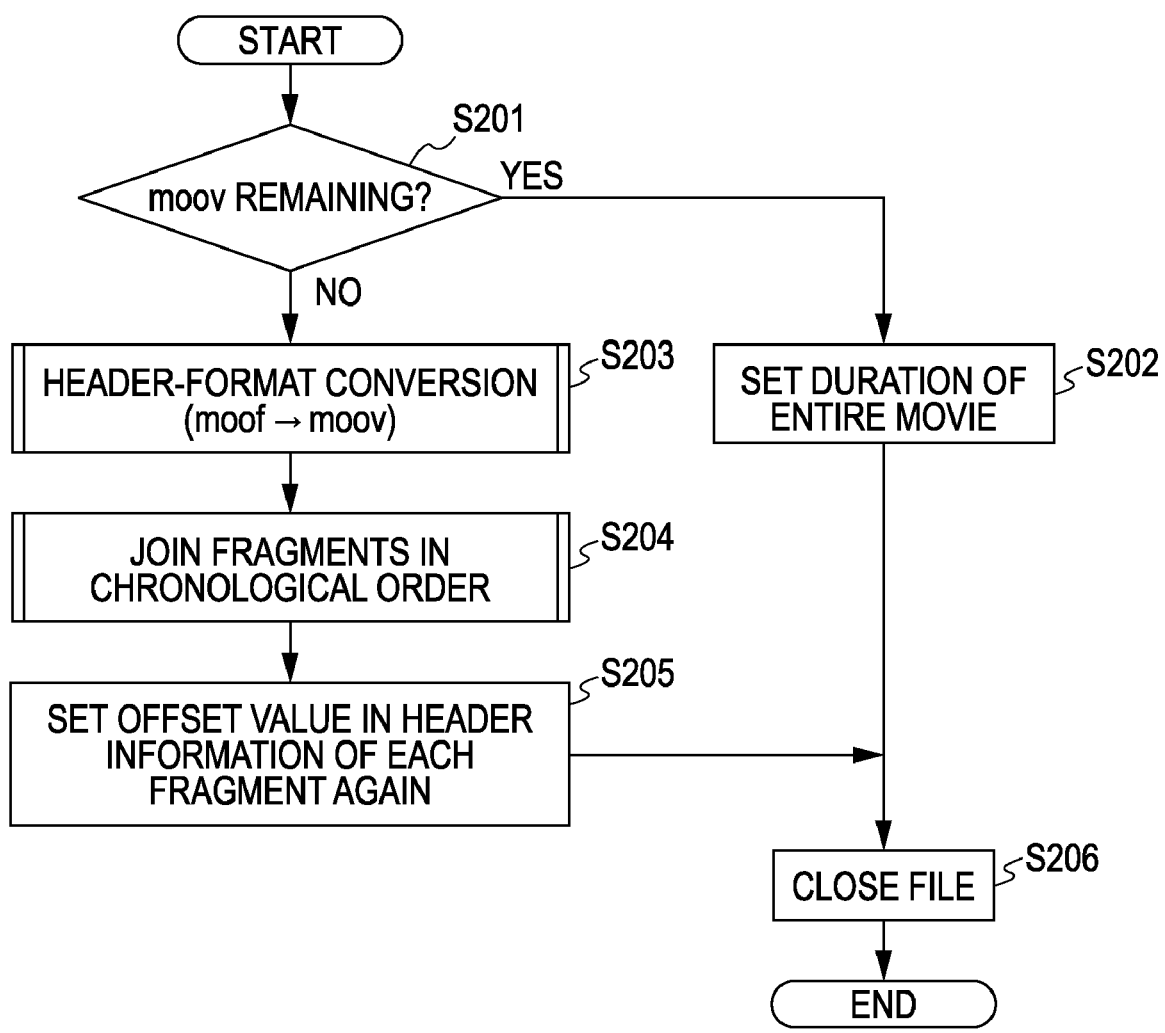
FIG. 11 is a flowchart illustrating a procedure for ending process for moving-image recording, according to an exemplary embodiment of the present invention.

The processing in step S203 and the processing in step S204 of FIG. 11 may be reversed. Nevertheless, it is desirable that processing be carried out in the order shown in FIG. 11 to prevent redundancy of processing. This is because if the area for the moov-format header after conversion is larger than the area for the original moof-format header as a result of the header conversion processing in step S203, the offset value may be adversely affected.

Figure 13:
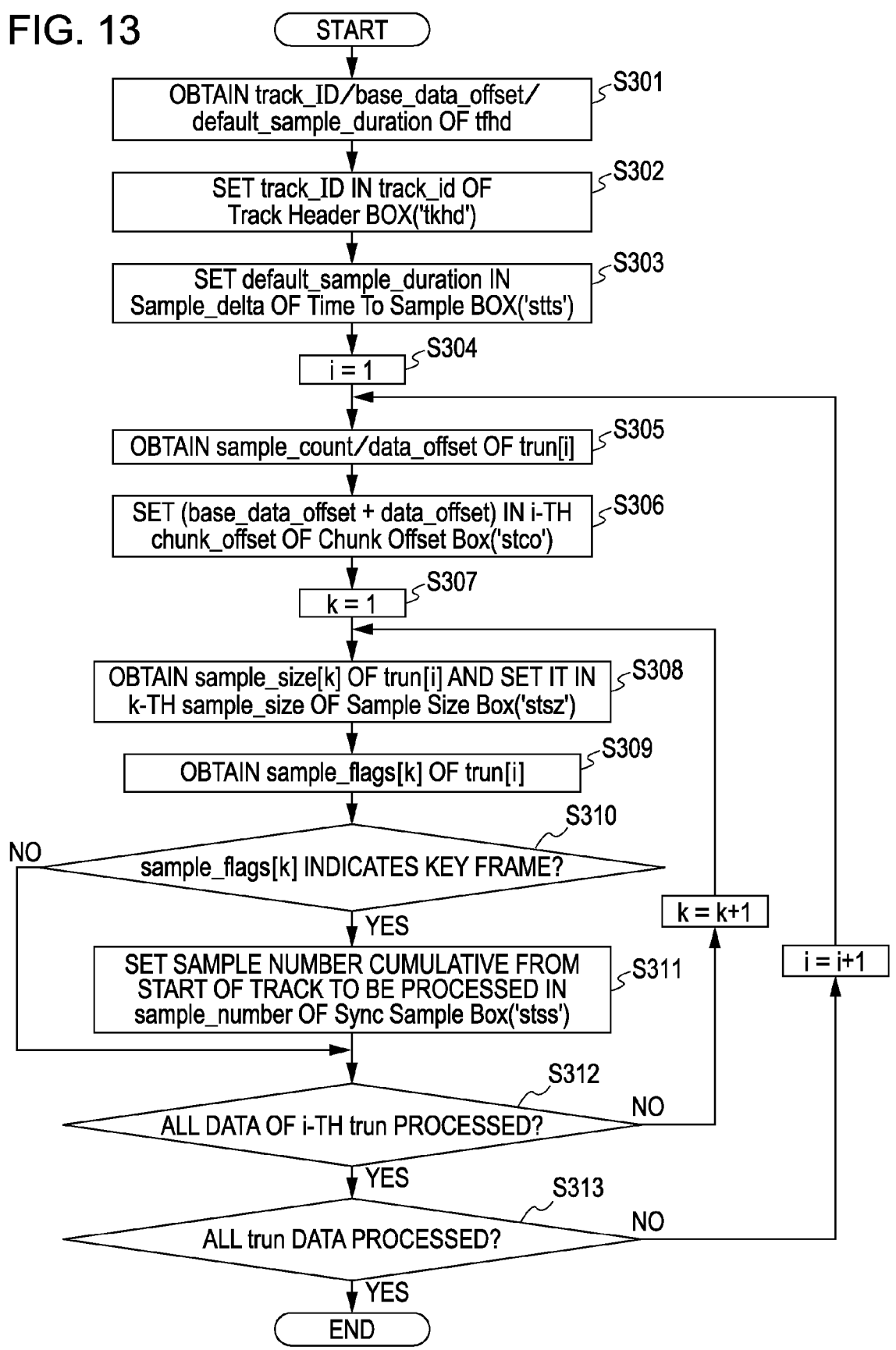
FIG. 13 is a flowchart illustrating processing for converting moof into moov, according to an exemplary embodiment of the present invention.

The conversion processing from moof to moov in step S203 of FIG. 11 will now be described with reference to the flowchart shown in FIG. 13.

To simplify the description, in accordance with an exemplary embodiment, it is assumed that all samples in a file to be processed according to this embodiment have the same playback time (frame rate is fixed for moving image data and the sampling rate is fixed for audio data) and that no priority, padding bits, etc. are set. It is also assumed that all samples on the same track have the same information with respect to, for example, the encoding format.

<Conversion of Metadata Format from moof to moov>

The converting process to convert moof into moov according to an exemplary embodiment is carried out as follows. First, in step S301, the joining section 902 acquires track_ID, base_data_offset, and default_sample_duration from Track Fragment BOX ('tfhd') included in the metadata portion of the fragment to be processed. Then, in step S302, the acquired track_ID is set in track_id of Track Header BOX ('tkhd') included in the moov header to be newly generated. Next, in step S303, default_sample_duration is set in sample_delta of Time To Sample BOX ('stts') included in the track, in which the above-described track_ID is set, included in the moov header to be newly generated, and a value 1 is set for entry_count of the stts.

In step S304, loop processing is initialized to carry out processing on a chunk-by-chunk basis because there are typically two or more chunks. In this example, a variable i used as an index of the chunk to be processed is initialized to 1.

In step S305, sample_count and data_offset are acquired from trun[i] corresponding to the i-th chunk. These values correspond to the number of samples and the offset value of the chunk, respectively, included in the i-th chunk in the relevant track in the moov header to be generated anew.

Next, in step S306, the value of base_data_offset+data_offset is set in the i-th chunk_offset of Chunk Offset BOX ('stco') included in the track, in which the above-described track_ID is set, included in the moov header to be newly generated.

In step S307, loop processing is initialized to carry out processing on a sample-by-sample basis because there are typically two or more samples in one chunk. In this example, a variable k used for the sample number in the chunk to be processed is initialized to a value 1.

Next, in step S308, sample_size of the k-th sample in the i-th chunk is acquired to set it in the k-th sample_size of Sample Size BOX ('stsz') included in the track, in which the above-described track_ID is set, included in the moov header to be newly generated.

Next, in step S309, sample_flags of the k-th sample in the i-th chunk is acquired.

In step S310, it is determined whether or not the sample_flags acquired in step S309 designates a key frame. If the result indicates that the sample_flags designates a key frame (S310, Yes), the processing proceeds to step S311, where the sample number cumulative from the beginning included in the track to be processed is set in sample_number of Sync Sample BOX ('stss') included in the track, in which the above-described track_ID is set, included in the moov header to be newly generated.

Next, in step S312, it is determined whether or not all samples in the i-th chunk have been processed. If the variable k has not reach the number of samples in i-th chunk (S312, No), the variable k is incremented to repeat the processing from steps S308 to S312.

Next, in step S313, it is determined whether or not all chunks have been processed. If there is an unprocessed trun (S313, No), the variable i is incremented to repeat the processing from steps S305 to S313.

The above-described processing is carried out on each track to be converted. In short, moof-format metadata in the fragment to be processed can be reconstructed into moov-format metadata by processing all structure information at the same level as or below the tfhd in the moof.

Furthermore, there is some information that is necessary for generating the moov and that is not included in the moof. For example, since "decoding-specific information" included in Sample Description BOX ('stsd') is not included in the moof, such information needs to be stored in a memory when the moov is to be deleted. More specifically, the following processing is included in the joining section 902: the content of an already processed moov is retained in the RAM so that when conversion from the moof to the moov is to be performed, information which does not exist in the moof can be acquired from the content of the moov retained in the RAM.

<Regeneration of mvex>

As described above, the moov needs to include a mvex for the fragment-movie format. In this embodiment, because the moov is deleted while moving-image and audio data is being recorded, a mvex needs to be added when a moof is converted into a moov to regenerate a moov.

The mvex includes a BOX called Track Extends BOX ('trex'), which includes the definition of fields as shown in FIG. 14. If all samples constituting each track have the same attribute, a default attribute applicable to all samples can be retained. For this reason, if there is an attribute to be applied to all samples in each track, a value is set in the trex. In the example of this embodiment, a default sample duration is set in the default_sample_duration field, assuming that the durations of all samples are the same.

<Sorting Sequence Numbers>

For fragment movies, Movie Fragment Header BOX ('mfhd') in the moof includes sequence_number reflecting the number of fragments, which is incremented for each movie fragment in the file in order of occurrence of the fragments, normally starting with a value 1.

In this embodiment, the values in the sequence_number may go out of order because old fragment data is replaced with new fragment data to keep the latest data with a limited recording capacity. To overcome this problem, in this embodiment, if the values in sequence_number go out of order when the oldest moof is converted into a moov, that is, as a result of a fragment being overwritten, a value 1 needs to be set to the sequence_number of the oldest moof data next to the moof that has been converted into the moov and the sequence_number sequentially incremented in order of occurrence of the moof needs to be set again in each mfhd area to rearrange the fragments in chronological order.

The joining process of the fragments in chronological order in step S204 of FIG. 11 will now be described.

<Joining Process of Fragments in Chronological Order>

For an MP4 file in the fragment-movie format, the sequence number of each fragment needs to increase in order of occurrence of fragments, as described above. In other words, the order of occurrence of each fragment from the beginning of the file needs to be sorted in chronological order. In this embodiment, because old data is overwritten (re-placed) with new data to prevent the file size from exceeding a certain threshold in the data recording section 901, the order of occurrence of the fragments in the file from the beginning of the file is not in chronological order when the overwriting process occurs. To overcome this problem, the File Allocation Table (FAT) file system is employed as a file system for a medium onto which files are recorded so that the fragments are rearranged in chronological order by manipulating the information in this FAT area.

In a file system employing the FAT, reading from and writing to a storage medium are processed on a cluster-by-cluster basis, so that any file larger than one cluster is saved divided into a plurality of clusters. The cluster addresses in this case may not be sequential, and therefore, the order in which the clusters are arranged is recorded in the FAT area. This sequence of clusters is called a cluster chain.

A cluster includes a plurality of basic blocks called sectors, each of which is normally 512 bytes. The optimal cluster size differs depending on, for example, the capacity of a recording medium to be formatted.

In this embodiment, as shown in FIG. 4, recording of each fragment is started from a cluster boundary. Therefore, the logical sequence of the fragments in the file can be rearranged in chronological order by rewriting the FAT entry corresponding to the write position of each fragment, as required, in the joining section 902.

Since the offset value of each fragment relative to the beginning of the file changes as a result of this joining process, the offset value needs to be corrected. This correction process has already been described with reference to FIG. 11.

Second Exemplary Embodiment

In the first embodiment according to the present invention, a method for recording the latest moving-image and audio data into one file on a recording medium with a limited capacity has been described.

In addition to the method according to the first embodiment, a second embodiment of the present invention describes a unit that allows the data for a portion, in input moving-image data or audio data, that has been subjected to a change exceeding a predetermined threshold to be written as a different file onto a recording medium.

Figure 15:
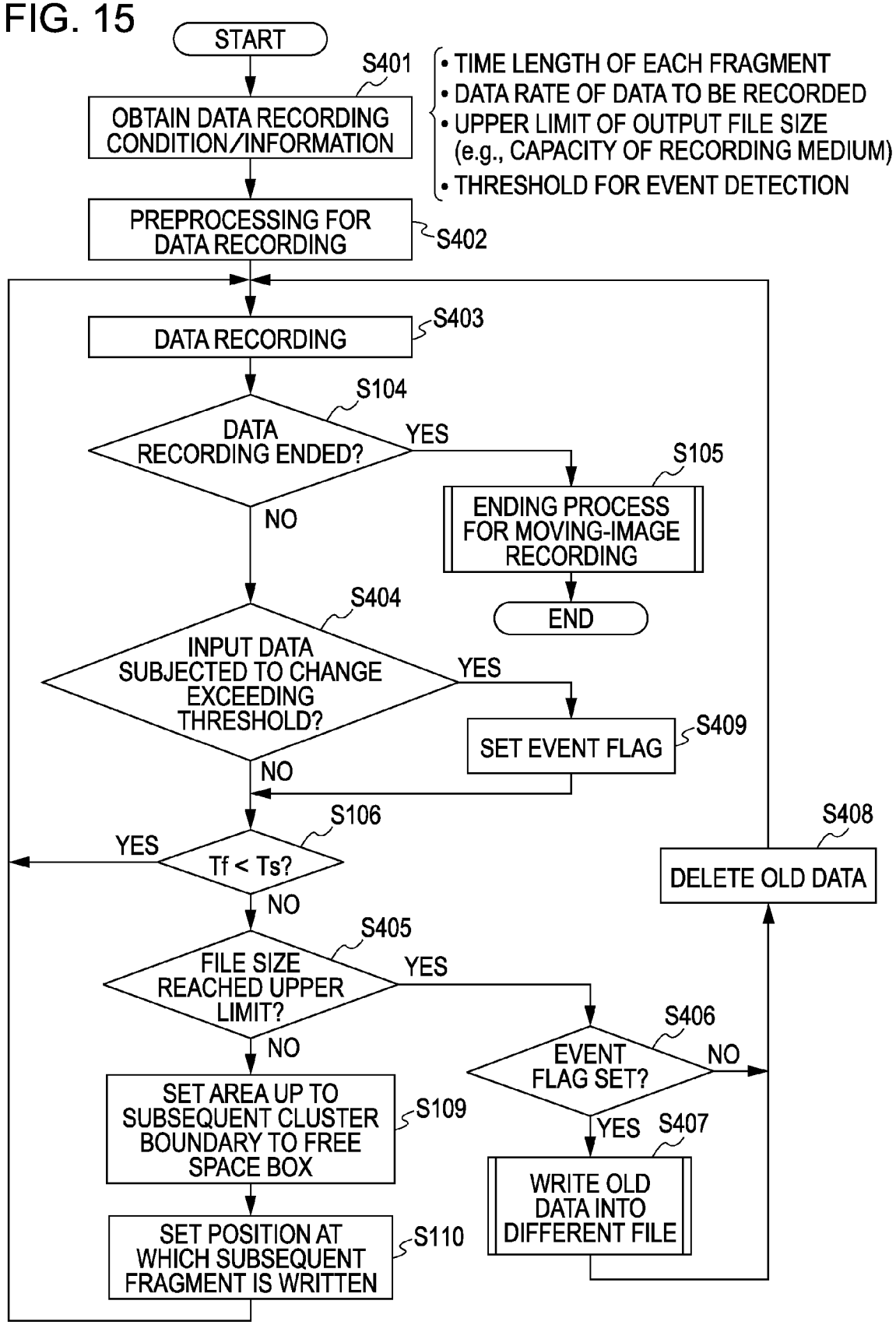
FIG. 15 is a flowchart illustrating a procedure for recording data at the time an event occurs during data recording, according to an exemplary embodiment of the present invention.

FIG. 15 illustrates a processing flow by the data recording section 901 according to the second embodiment. Since the basic processing flow is the same as or similar to that shown in FIG. 10 according to the first embodiment, only points different from those in the processing flow of FIG. 10 will be discussed mainly.

First, in step S401, a threshold for event detection corresponding to the input data type is received, as well as the time length of each fragment, the free storage space on the recording medium, the upper limit of the output file size, the data rate (bit rate) of the input moving image or audio data. These acquired items of information are retained, for example, in the RAM 803, the external storage device 804, or the recording medium 812. The threshold for this event detection may be the amount of change in motion vector or luminance level in a certain period of time in the case of, for example, moving image data. On the other hand, in the case of audio data, the threshold for this event detection may be a sound volume (absolute value), the amount of change in sound volume within a certain period of time, etc.

Next, in step S402, information necessary for decoding the input media data, information optionally input for the identification of the file, etc. are received. Furthermore, initialization processing of the memory which is necessary for forming header information (metadata) in the fragment-movie format to be generated is carried out, and then in step S403, processing for recording the input media data into the file is started.

In step S404, it is determined whether the media data recorded in the file in step S403 has been subjected to a change designating an occurrence of an event.

For this event detection, the data recording section 902 receives via the video I/F 805 and the audio I/F 806 a motion vector or the amount of change in luminance level within a certain period of time in the case of video or a sound volume or the amount of change in sound volume within a certain period of time in the case of audio, as well as the media data to be recorded, and compares the received value with the threshold received in step S401.

If there is a change exceeding the threshold (S404, Yes), a flag indicating a change in the fragment portion being recorded is set (step S409). Hereinafter, this flag is referred to as an event flag in this embodiment.

The event flag is retained, for example, in the RAM in a table format as shown in FIG. 16. In this table, the following information is recorded for each fragment: the reference offset indicating the start address of the fragment, the total size of the fragment including the free area of the fragment, and the event flag indicating whether an event has occurred in the data recorded in the fragment.

In step S405, if the size of the file being recorded has reached the upper limit of the output file size (S405, Yes), it is determined whether or not an event flag is set for the data for the old fragment to be deleted in step 406, according to this embodiment. If an event flag is set (S406, Yes), the data for this fragment is not deleted. Instead, in step S407, the data is written as another separate file on the recording medium.

At this time, if the fragment to be written has moof-format header information, header conversion of metadata from the moof format to the moov format is carried out by the above-described unit. This conversion processing may be carried out at any time before recording of the file is completed.

Furthermore, if a single file is too short to view as a result of one fragment being converted into the file, for example, in a case where the setting time for each fragment is short, a plurality of fragments, for example, before and after the fragment at which an event flag is set may be written as a different file. This processing method will not be described in the present specification.

If old data is written as a different file in step S407, the data for the next oldest fragment is further deleted in step S408 to secure an area for recording new data.

Figure 10:
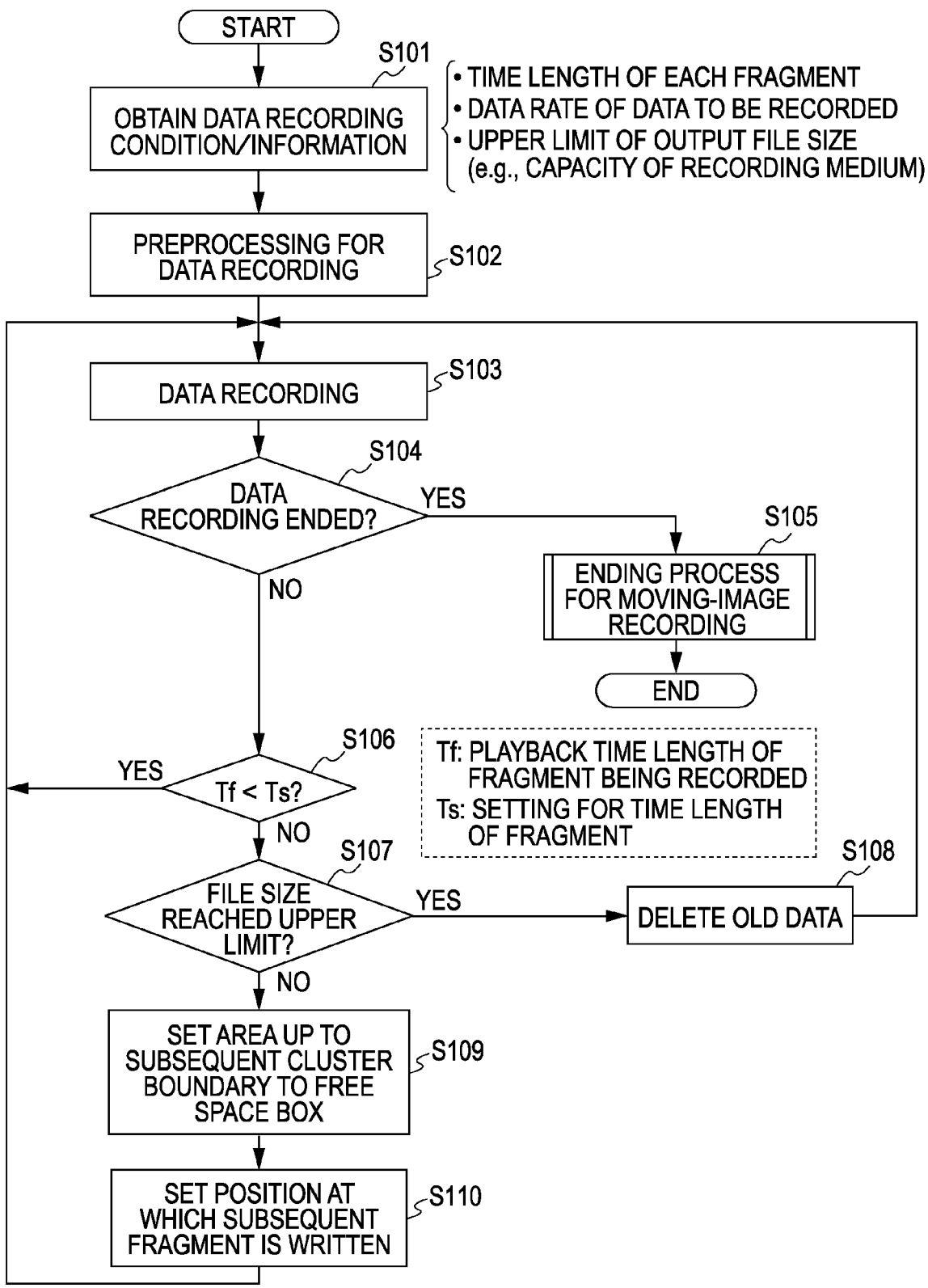
FIG. 10 is a flowchart illustrating general operations for carrying out data recording according to an exemplary embodiment of the present invention.

The processing in the steps that are not referred to in FIG. 15 is carried out in the same or similar manner as that in the corresponding steps in FIG. 10 according to the first embodiment. In addition, the processing and components that are not referred to in the second embodiment are the same as or similar to the corresponding ones in the first embodiment.

As described above, according to the first and second embodiments, long-term moving image and audio can be recorded onto a recording medium with a limited capacity by assigning priority to the latest data while still ensuring general versatility of the recorded data.

Alternative Exemplary Embodiments

The embodiments of the present invention can be realized in the form of aspects including a system, an apparatus, a method, a program, or a storage medium. More specifically, the embodiments of the present invention may be applied to a system composed of a plurality of devices or an apparatus composed of one device.

In addition, an aspect of the present invention can also be achieved by supplying a system or an apparatus with a non-transient storage medium (or recording medium) having thereon the program code of software which realizes the functions of the above-described embodiments, and then causing the computer (or the CPU or the MPU) of the system or apparatus to read and execute the program code stored in the storage medium. In this case, the program code itself read from the non-transient storage medium achieves the functions of the above-described embodiments. Thus, a non-transient storage medium that records the program code is included in embodiments of the present invention. As described above, the functions of the above-described embodiments are achieved with the execution of the program code read by the computer. In addition, the functions of the above-described embodiments may also be achieved by the operating system (OS) running on the computer that performs all or part of the processing according to the commands of the program code.

Furthermore, the functions of the above-described embodiments may also be achieved such that the program code read from the storage medium is written to a memory provided in an expansion card disposed in the computer or an expansion unit connected to the computer and then the CPU provided on the expansion card or the expansion unit performs all or part of the processing based on commands in the program code. A recording medium for supplying the program includes a Floppy® disk, a hard disk, an optical disk, a magneto-optical disk, an MO, a CD-ROM, a CD-R, a CD-RW, a magnetic tape, a non-volatile memory card, a ROM, a DVD (DVD-ROM, DVD-R, DVD+R, DVD-RW, DVD+RW, DVD-RAM), a HDDVD, a Blue-ray Disc, etc.

When embodiments of the present invention are applied to the above-described storage media, the storage media store program code corresponding to the aforementioned flowcharts.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-188297 filed Jun. 28, 2005, which is hereby incorporated by reference herein in its entirety.

What is claimed is:

1. A data recording apparatus for recording media data of at least one of moving image data and audio data into a file, comprising:
   a recording unit configured to record the media data in a memory on a fragment-by-fragment basis; and
   a control unit configured to control the recording unit such that the recording of new media data is started at a cluster boundary from which the oldest fragment has been recorded in a case where an amount of data recorded in the memory exceeds a predetermined amount of data;
   a converting unit configured to convert header information of the oldest fragment in the memory after the new media data is recorded under the control of the control unit, from a format not corresponding to a beginning of the file into a format corresponding to the beginning of the file; and
   a creating unit configured to create the file including the header information converted by the converting unit and the fragments recorded by the recording unit.

2. The data recording apparatus according to claim 1, wherein the recording unit records information used for converting the header information by the converting unit before recording the new media data.

3. The data recording apparatus according to claim 1, further comprising:
a joining unit configured to joins the media data in fragments time-sequentially by overwriting cluster link information in a file allocation table.

4. The data recording apparatus according to claim 1, wherein, in a case where a change which exceeds a predetermined threshold is detected in a fragment of input media data the recording unit adds a flag indicating the change in the fragment.

5. The data recording apparatus according to claim 4, wherein
The converting unit converts header information of the fragment to which the flag is added into the format corresponding to the beginning of the file.

6. The data recording apparatus according to claim 1, wherein the file is an MP4 file in a fragment-movie format.

7. A data recording method for recording media data of at least one of moving image data and audio data into a file, comprising:
recording the media data in a memory on a fragment-by-fragment basis such that each fragment starts at a cluster boundary;
controlling the recording step such that the recording of new media is started at a cluster boundary from which the oldest fragment has been recorded in a case where an amount of data recorded in the memory exceeds a determined amount of data;
converting header information of the oldest fragment in the memory after the new media data is recorded under the control of the controlling step, from a format not corresponding to a beginning of the file into a format corresponding to the beginning of the file; and
creating the file including the header information converted in the converting step and the fragments recorded in the recording step.

8. The data recording method according to claim 7, wherein, in the recording step, information used for converting the header information in the converting step is recorded before recording the new media data.

9. The data recording method according to claim 7, further comprising:
joining the media data in fragments time-sequentially by overwriting cluster link information in a file allocation table.

10. The data recording method according to claim 7, wherein, in the recording step, in a case where a change which exceeds a predetermined threshold is detected in a fragment of input media data, flag indicating the change is added in the fragment.

11. The data recording method according to claim 10, wherein, header information of the fragment to which the flag is added is converted into the format corresponding to the beginning of the file.

12. The data recording method according to claim 7, wherein the file is an MP4 file in a fragment-movie format.

13. A non-transient computer-readable medium having stored thereon instructions which, when executed by an apparatus, causes the apparatus to perform a method comprising:
recording media data in a memory on a fragment-by-fragment basis such that each fragment starts at a cluster boundary;
controlling the recording step such that the recording of new media data is started at a cluster boundary from which the oldest fragment has been recorded in a case where an amount of data recorded in the memory exceeds a determined amount of data;
converting header information of the oldest fragment in the memory after the new media data is recorded under the control of the controlling step, from a format not corresponding to a beginning of the file into a format corresponding to the beginning of the file; and
creating the file including the header information converted in the converting step and the fragments recorded in the recording step.

14. The non-transient computer-readable medium according to claim 13, further comprising:
joining the media data in fragments time-sequentially by overwriting cluster link information in a file allocation table.

* * * * *